United States Patent [19]

Gilman

[11] 4,338,798
[45] Jul. 13, 1982

[54] ADJUSTABLE TORQUE LIMITING APPARATUS

[76] Inventor: Russell A. Gilman, 5241 Village Cir. Dr., Temple City, Calif. 91780

[21] Appl. No.: 156,658

[22] Filed: Jun. 5, 1980

[51] Int. Cl.³ .............................................. F16D 7/02
[52] U.S. Cl. ................................... 464/23; 192/56 R; 464/41; 464/47; 464/178
[58] Field of Search ...................... 64/30 R, 30 C, 29; 192/56 R

[56] References Cited

U.S. PATENT DOCUMENTS

| | | | |
|---|---|---|---|
| 1,024,151 | 4/1912 | Smith | 64/30 C |
| 1,593,732 | 7/1926 | Street | 64/30 C |
| 2,743,637 | 5/1956 | Redmon | 64/30 R X |
| 2,943,466 | 7/1960 | Elliott | 64/30 C |
| 3,116,618 | 1/1964 | Lacey | 64/30 R |
| 3,180,113 | 4/1965 | Onyskin | 64/30 R |
| 3,233,429 | 2/1966 | Kohen et al. | 64/30 R |
| 3,854,561 | 12/1974 | Conoe | 64/30 C |

Primary Examiner—Wendell E. Burns
Attorney, Agent, or Firm—Christie, Parker & Hale

[57] ABSTRACT

Apparatus for limiting the amount of torque to a driven shaft having a tool for applying power to a workpiece is continuously adjustable throughout a predetermined range. A housing defines a cylindrical chamber open at one end having an adjustable plate disposed therein. First and second shafts enter the housing through opposite ends and have first and second disks attached thereto within the housing. Disks are frictionally coupled by a force generated by a spring disposed about the first shaft between the adjustable plate and the first disk. When the preselected limit of torque is exceeded the disks slip with respect to one another thus, limiting the amount of torque delivered by the apparatus. Adjustment of the plate selectively increases or decreases the compression of the spring and thus, alters the maximal amount of torque that can be delivered. An alternative embodiment is disclosed for incorporating the apparatus within the housing of a power tool such as a drill motor.

43 Claims, 4 Drawing Figures

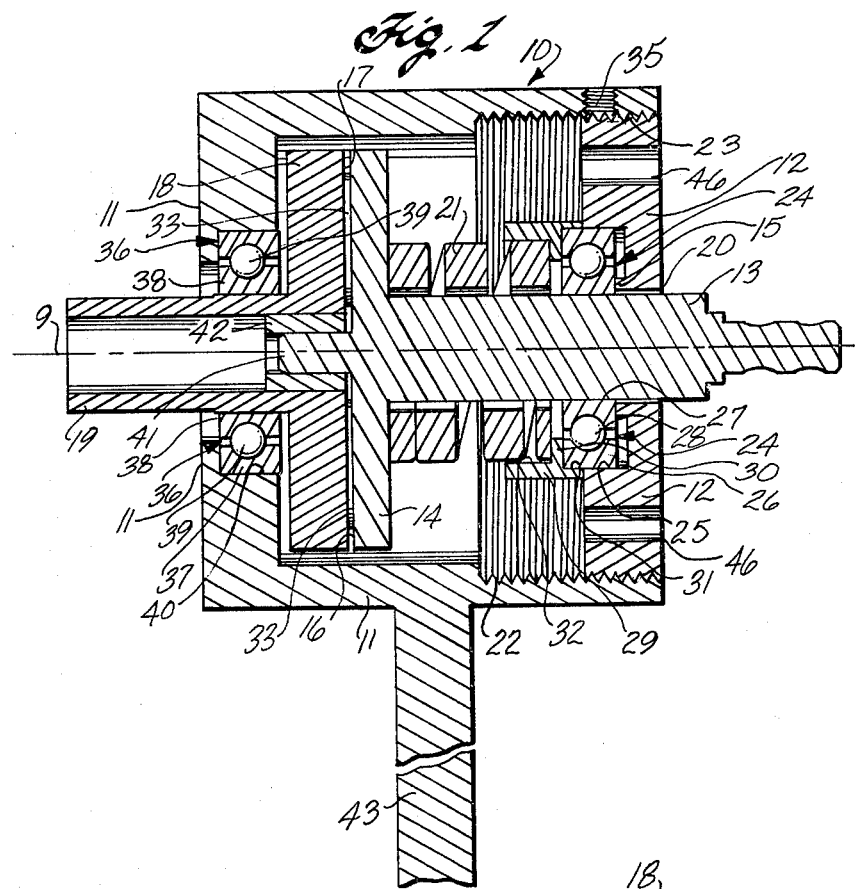
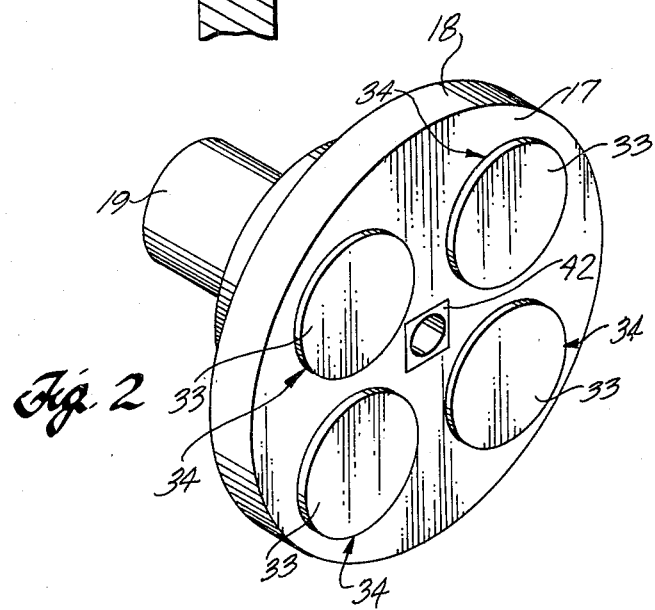

ADJUSTABLE TORQUE LIMITING APPARATUS

BACKGROUND OF THE INVENTION

This invention relates to adjustable torque limiting apparatus and more particularly to such apparatus suited for use with sources of rotary power such as drill motors and the like.

One type of torque limiting device in common use utilizes a clutch having frictionally mated surfaces which are preloaded and designed to slip with respect to one another. Slippage occurs when a predetermined limit of torque is delivered by a power source, such as a drill motor, to the input of the device. For example, U.S. Pat. No. 3,710,591 to Gore et al. discloses a power drive clutch comprising a carrier housing, an input shaft, and a pair of elements within the housing which have mutual surfaces which are frictionally mated and spring loaded such that when a predetermined amount of torque is delivered to the input shaft the surfaces slip with respect to one another so that power is no longer delivered to the carrier housing. A drill bit or the like is selectively attached to the carrier housing for applying power to a workpiece. This type of device has a disadvantage in that the carrier housing rotates until the predetermined torque rating is exceeded. A safety hazard thus arises due to the fact that this type of tool is often used with high speed power equipment. Furthermore, the Gore et al device cannot be adjusted by the user thus precluding readjustment of the maximum torque setting for varying applications in which the device may be used.

An important use of a torque limiting device is to control the torque transmitted to a conventional self-feeding tube expander. If too much or too little torque is applied to the tube expander, a good seal between the expanded tubes and the supporting sheet is not established.

SUMMARY OF THE INVENTION

A principle advantage of the invention herein is that the outer housing of the torque limiting apparatus is stationary and thus presents no safety hazard to the user. Furthermore, a handle or other point of purchase may be incorporated into the housing to assist the user in aligning or supporting the apparatus and associated rotary tool. Additionally, because the outer housing is stationary, the apparatus may be incorporated into the housing of the tool itself, for example, the apparatus may be incorporated into the housing of a drill motor. The device is also easily adjusted so that the operator may selectively alter the maximum torque setting.

According to the invention, an adjustable torque limiting apparatus comprises a housing defining a cylindrical chamber open at one end and substantially closed at the other end, an adjustable plate disposed at the open end of the housing adjustable along the central axis of the cylindrical chamber, a first rotatable shaft extending through the adjustable plate into the chamber, a first disk having a first circular surface, the disk attached to the interior end of the first shaft and having a central axis coincident with that of the chamber, a second rotatable shaft extending through the substantially closed end of the housing into the chamber with its longitudinal axis coincident with that of the chamber, a second disk having a second circular surface, the disk attached to the end of the second shaft and having a central axis coincident with a central axis of the first disk, the first and second circular surfaces being frictionally coupled by a force created by a compression spring disposed around the periphery of the first shaft between the adjustable plate and the first disk.

In an alternative embodiment the adjustable torque limiting apparatus is provided for a power tool such as a drill motor having a driving shaft and a housing, the apparatus comprises a cylindrical chamber defined by the housing open at one end, a plate disposed at the open end of the chamber adjustable along the central axis of the chamber, a rotatable driven shaft extending through the adjustable plate into the chamber, a first disk having a first circular surface, the disk attached to the driven shaft within the chamber and having its central axis coincident with that of the chamber, a second disk having a second circular surface, the disk attached to the driving shaft having its central axis coincident with the central axis of the first plate, the first and second circular surfaces being frictionally coupled by a force created by a compression spring disposed around the periphery of the driven shaft between the adjustable plate and the first disk.

A principle advantage of the invention resides in the fact that greater safety and stability is achieved by the utilization of a stationary outer housing. Furthermore, the release point of the apparatus is continuously adjustable by rotating the adjustable end plate to selectively determine the maximum torque which the device will deliver before the first and second plates slip with respect to one another. The invention is particularly useful to limit the torque transmitted to self-feeding tube expanders operated at low torque limits, e.g. below 120 inch-pounds.

BRIEF DESCRIPTION OF THE DRAWINGS

The features of the specific embodiments of the best mode contemplated of the carrying out of the invention are illustrated in the drawings, and which:

FIG. 1 is a side sectional view of an adjustable torque limiting device incorporating the principles of the invention;

FIG. 2 is a perspective view of a circular disk incorporating principles of the invention;

DETAILED DESCRIPTION OF THE SPECIFIC EMBODIMENTS

Figure 4:
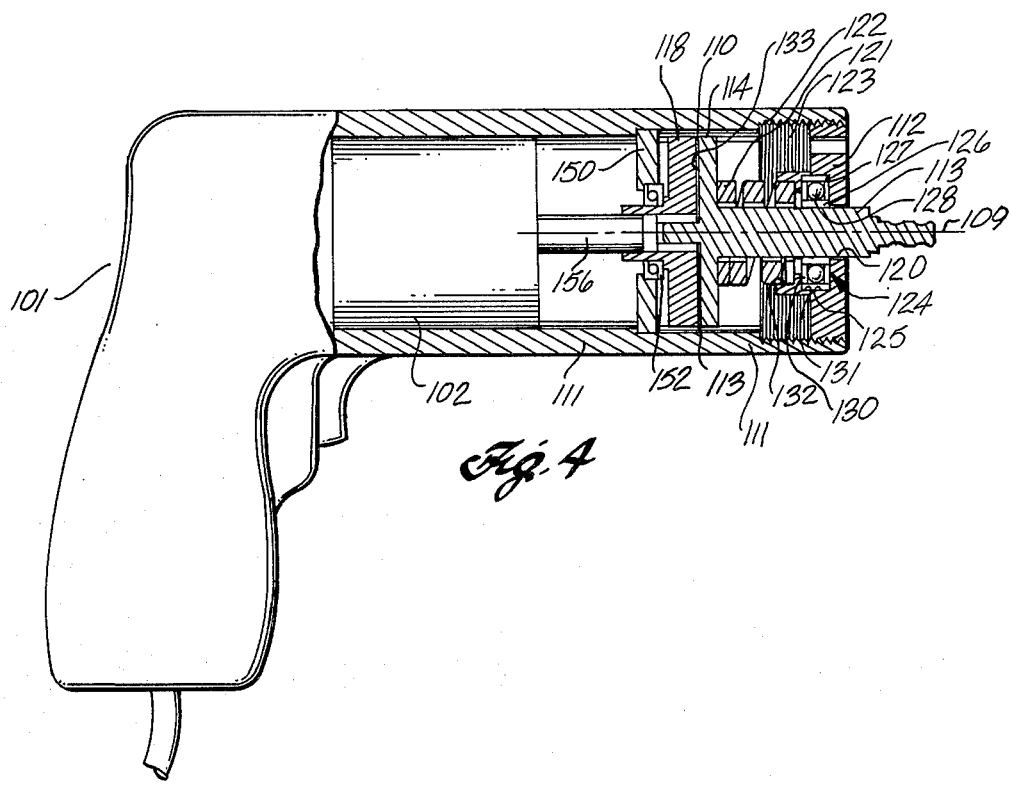
FIG. 4 is a side sectional view of an alternative embodiment of an adjustable torque limiting device incorporating the principles of the invention.

In FIGS. 1 and 2, an adjustable torque limiting device 10 has a housing 11 defining a cylindrical chamber open at one end and substantially closed at the other end. An adjustable plate 12 is disposed at the open end of the housing and is adjustable along the central longitudinal axis 9 of the cylindrical chamber. A threaded set screw 35 extends radially through a threaded bore in housing 11 to the outer surface of plate 12 to permit its position to be fixed relative to housing 11. The interior of the chamber defines a helical groove 22 which is disposed at the open end of the housing. A matching helical groove 23 is defined by the outer periphery of the adjustable plate 12. The helical groove 23 of the plate 12 cooperatively engages the helical groove 22 of the chamber to permit selective positioning of the plate 12 along the longitudinal axis of the chamber by clockwise or counterclockwise rotation of the plate.

A first rotatable shaft 13 extends through the adjustable plate 12 into the chamber. A first disk 14 having a first circular surface 16 is attached to the end of the first shaft 13 located within the chamber and has a central axis coincident with the central longitudinal axis of the chamber. A second rotatable shaft 19 extends through a hole 9 formed in the otherwise closed end of the housing 11 into the chamber with its longitudinal axis coincident with that of the chamber. A second disk 18 is attached to the end of the second shaft 19 located within the chamber with its central axis coincident with the central axis of the first disk 14. The second disk has a second circular surface 17 which is frictionally coupled to the first frictional surface 16.

A compression spring 21 is disposed around the outer periphery of the first shaft 13 between the adjustable plate 12 and the first disk 14. In the preferred embodiment both ends of the spring 21 are ground so that the ends are mutually parallel and both perpendicular to the longitudinal axis of the spring. The spring is fabricated from wire which has a rectangular or square cross section.

A first bearing set 24 is utilized for journaling the first shaft 13. The bearing set which could comprise a conventional radial-thrust type bearing, comprises an outer race 26, an inner race 27, and roller or ball bearings 28 disposed between the races. Inner race 27 is secured on shaft 13. The first bearing set 24 is seated in a circular recess 25 in the adjustable plate 12 having an inner diameter large enough to receive the bearing set 24 with a slip fit. The adjustable plate 12 has a centrally disposed opening 20 through which the first shaft 13 passes without contact. An inwardly facing boss 15 is disposed about the periphery of the opening 20 such that the inner race 27 of the first bearing set 24 bears against the boss 15 but the outer race 26 does not contact the flat end surface of recess 25.

In the preferred embodiment the outer race 26 of the first bearing set 24 is coupled to the ground end of the compression spring 21 by means of a collar 29. The collar has an outer surface of uniform diameter and first and second inner surfaces, 31 and 32 respectively, separated by an inwardly facing annular flange 30. The flange 30 forms a central circular opening which has an inside diameter greater than the outside diameter of the inner race 27 of the first bearing set 24. The first inner surface 31 has a diameter large enough to receive set 24 with a slip fit, while the second surface 32 has an inside diameter large enough to receive one end of the compression spring 21 with a slip fit. The collar 29 is disposed such that the end of the compression spring 21 opposite the first disk 14 is seated within the opening defined by the second surface 32 against the flange 30. The first bearing set 24 is seated in the opening defined by the first surface 31 against the side of the flange 30 opposite the spring 21. This arrangement permits the outer race 26 of the first bearing set 24 to be coupled to the compression spring 21 while maintaining the inner race 27 away from the ground end of the compression spring 21. This arrangement additionally permits the first and second shafts and first and second disks to rotate within the stationary housing while permitting external adjustment of the apparatus by rotating the adjustable plate 12.

Frictional material 33, having a high coefficient of friction with respect to the opposing circular surface, is disposed between the first 16 and the second 17 circular surfaces. In the preferred embodiment the frictional material is comprised of sintered bronze impregnated with graphite. The frictional material is appropriately inserted in to either the first or second circular surfaces and is press fit within a plurality of circular recesses 34 disposed over the surface of either the first or second disk. The frictional material 33 protrudes outwardly from the recesses 34 thus forming a frictional surface with respect to the opposing circular surface. This arrangement permits free flow of air between the disks thus facilitating cooling. FIG. 2 is a perspective view of the second disk 18 having the frictional material 33 inserted in its circular surface 17. However, it is contemplated that the frictional material could be alternatively inserted in the circular surface 16 of the first disk 14. In the preferred embodiment four circular areas are uniformly spaced about the center of the selected circular surface. The disk selected to carry the frictional material may be fabricated from ferrous of nonferrous metal. The alternate disk has a circular surface fabricated from mild steel or the like in order to achieve a favorable coefficient of friction with the sintered bronze frictional material.

A second bearing set 36 comprised of an outer race 37 an inner race 38 and roller or ball bearings 39 is seated in a substantially closed end of the chamber in a circular recess 40 having a diameter adapted to receive the second bearing set 36 with a slip fit. Bearing set 36 could also be a conventional radial-thrust type bearing. Inner race 38 is secured on shaft 19; both are out of contact with housing 11.

A pilot shaft 41 extends from the first shaft 13 and is received by a pilot bearing 42 disposed in the end of the second shaft 19 for maintaining the alignment of the first and second disks. Alternatively, the pilot shaft may extend from the second shaft and be received by a pilot bearing disposed in the end of the first shaft. Either embodiment insures the maintenance of proper alignment of the first and second disks.

A handle 43 is appropriately attached to the housing to aid the operator in positioning the adjustable torque limiting device 10. This feature is made possible by the fact that the housing 11 does not have to rotate while operating the apparatus.

Calibration means are provided to assist the operator in selecting the maximal limit of torque to be delivered by the device. In one preferred embodiment FIG. 3, the adjustable plate 12 has a scale 44 inscribed on its outwardly facing surface around the periphery of the plate and the housing 11 has an index 45 pointer for cooperating with the scale. Alternatively, the scale may be inscribed on the housing around the periphery of its open end and the adjustable plate may have the index pointer for cooperating with the scale.

The adjustable plate 12 defines at least one pair of adjustment holes 46 each of which lies on opposite sides of the center of the plate along a common diameter. A Y-shaped tool 47 having a first arm 48 and a second arm 49 has first and second pins, 51 and 52, attached to the first and second arms respectively such that the pins have a diameter slightly less than that of the adjustment holes 46 and are spaced apart so that the pins may be selectively inserted into the adjustment holes 46. This arrangement permits the operator to adjust the device by rotating the plate by means of the tool 47. Instead of tool 47 and holes 46, a hex nut could be formed integral with plate 12 so a conventional wrench could be used to make the adjustment.

In operation, a source of power, such as a drill motor is appropriately coupled to either the first 13 or second shaft 19. A tool such as a conventional self-feeding tube expanded or other torque sensitive tool is then appropriately attached to the opposite shaft. By selectively rotating the adjustable plate 12 in either a clockwise or counterclockwise direction by means of the Y-shaped tool 47, an increasing or decreasing load, respectively, is imparted to the compression spring 21 through the adjustable plate 12, outer race of the first bearing set 24 and coupling collar 29. This predetermined load created by the force generated by the compressed spring is thus applied to the first 14 and second 18 disks so that they will rotate as a frictionally coupled pair until the predetermined torque limit is reached. After plate 12 is rotated to set the desired torque limit, set screw 35 is tightened to lock plate 12 in place so the transmitted torque remains identical for multiple operations.

Power from the source of power is transferred through the device to the tool and finally to the workpiece. At the predetermined torque limit the frictional force created by the preloading of the disks is overcome so that the driving plate slips with respect to the driven plate. Consequently the tool no longer delivers torque to the workpiece through the tool when the predetermined torque limit is exceeded.

The design of the tool permits either the first or second shaft to be attached to the source of power while the opposite shaft may be utilized for attachment of the appropriate tool. It is contemplated to be within the skill of one practicing in the field of this invention to adapt the shafts for attachment to the desired source of power and the tool to be used.

In FIG. 4 a preferred alternative embodiment of an adjustable torque limiting device 110 is incorporated into the housing 111 of a power device such as a drill 101. The housing 111 defines a cylindrical chamber disposed within the housing such that the driving shaft 108 of the tool terminates within the chamber. The chamber is open at one end and an adjustable plate 112 is disposed therein and is adjustable along the central longitudinal axis of the cylindrical chamber 104. The interior of the chamber defines a helical groove 122 which is disposed at the open end of the housing. A matching helical groove 123 is defined by the outer periphery of the adjustable plate 112. The helical groove 123 of the plate 112 cooperatively engages the helical groove 122 of the chamber to permit selective positioning of the plate 112 along the longitudinal axis of the chamber by clockwise or counterclockwise rotation of the plate.

A rotatable driven shaft 113 extends through the adjustable plate 112 into the chamber. A first disk 114 having a first circular surface 116 is attached to the end of the driven shaft 113 located within the chamber and has a central axis coincident with the central longitudinal axis of the chamber. The driving shaft 108 projects into the chamber from the end opposite the rotatable driven shaft 113 and is disposed with its longitudinal axis coincident with that of the chamber. The driving shaft 108 is coupled to the source of power such as an electric motor 102. A second disk 118 is attached to the end of the driving shaft 108 with the central axis coincident with the central axis of the first disk 114. The second disk has a second circular surface 117 which is frictionally coupled to the first circular surface 116.

A thrust plate 150 is retained by a shoulder in housing 111. Shaft 108 is journaled for rotation and thrust in a bearing set 152, which fits in an opening 154 in plate 150. Shaft 108 extends through opening 154 for splined connection with a motor armature shaft 156.

A compression spring 121 is disposed around periphery of the driven shaft 113 between the adjustable plate 112 and the first disk 114. In the preferred embodiment both ends of the spring are ground so that the ends are mutually parallel and both perpendicular to the longitudinal axis of the spring. The spring is fabricated from wire which has a rectangular or square cross section.

A bearing set 124 is utilized for journaling the driven shaft 113. The bearing set comprises an outer race 126, and inner race 127. The bearing set 124 is seated in a circular recess 125 in the adjustable plate 112 having an inside diameter slightly greater than the outside diameter of the bearing set 124, thus limiting the lateral movement of the bearing set and driven shaft 113. The adjustable plate 112 defines a centrally disposed opening 120 through which the driven shaft 113 passes. An inwardly facing boss 115 is disposed about the periphery of the opening 120 such that the inner race 127 of the bearing set 124 is frictionally coupled to the boss so that the outer race 126 does not contact the inner surface of the adjustable plate 112.

In the preferred embodiment the outer race 126 of the bearing set 124 is coupled to the ground end of the compression spring 121 by means of a collar 129. The collar has an outer surface of uniform diameter and first and second inner surfaces 131 and 132, respectively, separated by a flange 130. The flange 130 defines a central circular opening which has an inside diameter which is greater than the outside diameter of the inner race 127 of the bearing set 124. The first inner surface 131 has a diameter large enough to receive set 124 with a slip fit, while the second surface 132 has an inside diameter large enough to receive one end of the compression spring 121 with a slip fit. The collar 129 is disposed such that the end of the compression spring 121 opposite the first disk 114 is seated within the opening defined by the second surface 132 adjacent to the flange 130. The bearing set 124 is seated in the opening defined by the first surface 131 against the side of the flange 130 opposite the spring 121. This arrangement permits the outer race 126 of the bearing set 124 to be coupled to the compression spring 121 while maintaining the inner race 127 away from the ground end of compression spring 121.

Frictional material 133 having a high coefficient of friction with respect to the opposing circular surface, is disposed between the first 116 and second 117 circular surfaces. In the preferred embodiment the frictional material is comprised of sintered bronze impregnated with graphite. Frictional material is appropriately inserted in either the first or second circular surfaces and is press fit within a plurality of circular recesses 134 disposed over either the first or second disk. The frictional material 133 protrudes outwardly from the recesses 134 thus forming a frictional surface with respect to the opposing circular surface. This arrangement permits free flow of air between the disks for facilitating cooling. In the preferred embodiment four circular areas are uniformly spaced about the center of the selected circular surface. The disk selected to carry the frictional material may be fabricated from ferrous or nonferrous metal. The alternate disk has a circular surface fabricated from mild steel or the like in order to achieve a favorable coefficient of friction with the sintered bronze frictional material.

A pilot shaft 141 extends from the driven shaft 113 and is received by a pilot bearing 142 disposed in the end of the driving shaft 19 for maintaining the alignment of the first and second disks. Alternatively, the pilot shaft may extend from the driving shaft and may be received by the pilot bearing disposed in the end of the driven shaft. Either embodiment is preferable because both insure the maintenance of proper alignment of the first and second disks.

Figure 3:
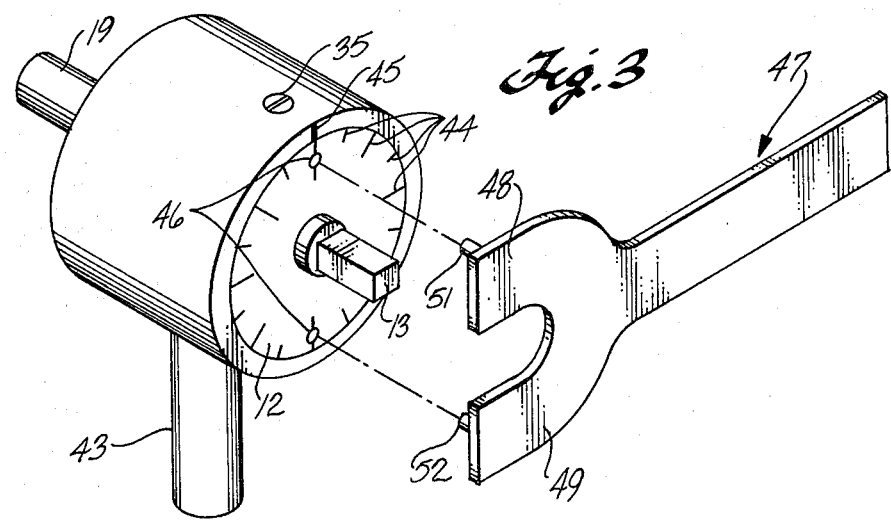
FIG. 3 is a perspective view of the invention depicting a tool for adjusting the device.

Calibration means for the embodiment shown in FIG. 4 are identical to those described for the embodiment shown in FIGS. 1, 2 and 3.

Adjustment means for the embodiment shown in FIG. 4 are identical to those described for the embodiment shown in FIGS. 1, 2 and 3.

Operation of the embodiment of the tool shown in FIG. 4 is similar to that of the previously described embodiment. However, the source of power is continuously attached to the device thus precluding the necessity for the operator to provide an external source of power. Furthermore, this embodiment provides an advantage in that the apparatus and the power source are conveniently disposed within the same housing.

The described embodiments of the invention are only considered to be preferred and illustrative of the inventive concepts; the scope of the invention is not to be restricted to such embodiments. Various and numerous other arrangements may be devised by one skilled in the art without departing from the spirit and scope of this invention. For example, asbestos based frictional material may be substituted for the sintered bronze impregnated with graphite. Also, the configuration of the frictional material on the frictional disks need not be limited to four circular areas but may include numerous other arrangements in order to accomplish the desired effect.

What is claimed is:

1. Adjustable torque limiting apparatus comprising:
a housing defining a cylindrical chamber open at one end and substantially closed at the other end;
an adjustable plate covering the open end of the housing, means for adjusting the plate along the central longitudinal axis of the cylindrical chamber;
a first rotatable shaft extending through the adjustable plate into the chamber with its longitudinal axis coincident with that of the chamber;
a first disk having a first frictional circular surface, the disk attached to the end of the first shaft located in the interior of the chamber, the shaft having its central axis coincident with that of the chamber;
a second rotatable shaft extending through the substantially closed end of the housing into the chamber with its longitudinal axis coincident with that of the chamber, the shaft being secured to prevent axial movement out of the chamber;
a second disk having a second circular surface, the disk attached to the end of the second shaft having a central axis coincident with the central axis of the first disk, the first and second frictional surfaces being frictionally coupled; and
means for urging the disk together.

2. The apparatus of claim 1 wherein the adjusting means comprises a helical groove defined by the interior of the chamber and a matching helical groove defined by the outer periphery of the plate, the helical groove of the plate cooperatively engaging the groove of the chamber to permit selective positioning of the plate along the longitudinal axis of the chamber by rotation of the plate.

3. The apparatus of claim 1 wherein the means for urging the disks together comprises a compression spring having at least one ground end.

4. The apparatus of claim 3 wherein the spring is fabricated from wire having a square cross section.

5. The apparatus of claim 1 additionally comprising a first bearing set for journaling the first shaft comprising an inner race and outer race separated by either ball bearings or roller bearings such that the inner race is coupled with the adjustable plate and the outer race is coupled to one end of the compression spring.

6. The apparatus of claim 5 additionally comprising means for coupling the adjustable plate with the compression spring.

7. The apparatus of claim 6 wherein the coupling means comprises a circular sleeve of uniform outside diameter and first and second inner surfaces having first and second diameters respectively, the inner surface being separated by a flange and the sleeve being disposed between the first bearing set and one end of the spring.

8. The apparatus of claim 1 wherein the first and second circular surfaces have frictional material disposed between them.

9. The apparatus of claim 8 wherein the frictional material is secured to the first disk.

10. The apparatus of claim 8 wherein the frictional material is secured to the second disk.

11. The apparatus of claim 9 or 10 wherein the frictional material is secured within a plurality of circular recesses disposed over the surface of the disk.

12. The apparatus of claim 8, 9, 10 or 11 wherein the frictional material is comprised of sintered bronze.

13. The apparatus of claim 12 wherein the sintered bronze is impregnated with graphite.

14. The apparatus of claim 1 additionally comprising a second bearing for journaling the second shaft comprising an inner race and outer race separated by either ball bearings or roller bearings.

15. The apparatus of claim 14 wherein the outer race is seated in the substantially closed end of the chamber and the inner race is press fit on the second shaft to prevent axial movement of the shaft out of the chamber.

16. The apparatus of claim 1 additionally comprising a pilot shaft extending from the first shaft and a pilot bearing disposed in the end of the second shaft which receives the pilot shaft for maintaining the alignment of the first and second disks.

17. The apparatus of claim 1 additionally comprising a pilot shaft extending from the second shaft and a pilot bearing disposed in the end of the first shaft which receives the pilot shaft for maintaining the alignment of the first and second disks.

18. The apparatus of claim 1 additionally comprising a handle attached to the housing for positioning the adjustable torque limiting apparatus.

19. The apparatus of claim 1 wherein the adjustable plate has a scale inscribed on its outwardly facing surface and the housing has an index pointer for cooperating with the scale.

20. The apparatus of claim 1 wherein the housing has a scale inscribed around the periphery of its open end and the adjustable plate has an index pointer for cooperating with the scale.

21. The apparatus of claim 1 wherein the adjusting plate defines a pair of holes lying on opposite sides of the center of the plate along a common diameter.

22. The apparatus of claim 21 additionally comprising means for rotating the adjustable plate.

23. The apparatus of claim 22 wherein the adjustment means comprises a Y-shaped tool having a handle and first and second arms extending therefrom and first and second adjustment pins extending upwardly from the first and second arms respectively, the pins having a diameter less than that of the adjustment holes and spaced apart so that the adjustment pins cooperate with the adjustment holes.

24. Adjustable torque limiting apparatus for a power tool having a driving shaft and a housing comprising:
   a cylindrical chamber defined by the housing, open at one end;
   a plate covering the open end of the chamber; means for adjusting the plate along the central axis of the chamber;
   a rotatable driven shaft extending through the plate into the chamber with its longitudinal axis concident with that of the chamber;
   a first disk having a first circular surface, the disk attached to the driven shaft within the chamber and having its central axis coincident with that of the chamber;
   a second disk having a second circular surface, the disk attached to the driving shaft having its central axis coincident with the central axis of the first plate the first and second frictional surfaces being frictionally coupled;
   means for urging the disks together.

25. The apparatus of claim 24 wherein the adjusting means comprises a helical groove defined by the interior of the chamber and a matching helical groove defined by the outer periphery of the plate, helical groove of the plate cooperatively engaging the groove of the chamber to permit selective positioning of the plate along the longitudinal axis of the chamber by rotation of the plate.

26. The apparatus of claim 24 wherein the means for urging the disks together comprises a compression spring having at least one ground end.

27. The apparatus of claim 26 wherein the spring is fabricated from wire having a square cross section.

28. The apparatus of claim 24 additionally comprising a bearing set for journaling the first shaft comprising an inner race and outer race separated by either ball bearings or roller bearings such that the inner race is coupled with the adjustable plate and the outer race is coupled to one end of the compression spring.

29. The apparatus of claim 28 additionally comprising means for coupling the adjustable plate with the compression spring.

30. The apparatus of claim 29 wherein the coupling means comprises a circular sleeve of uniform outside diameter and first and second inner surfaces having first and second diameters respectively, the inner surface being separated by a flange the sleeve being disposed between the bearing set and one end of the spring.

31. The apparatus of claim 24 wherein the first and second circular surfaces have frictional material disposed between them.

32. The apparatus of claim 31 wherein the frictional material is secured to the first disk.

33. The apparatus of claim 31 wherein the frictional material is secured to the second disk.

34. The apparatus of claim 32 or 33 wherein the frictional material is secured within a plurality of circular recesses disposed over the surface of the disk.

35. The apparatus of claim 31, 32, 33 or 34 wherein the frictional material is comprised of sintered bronze.

36. The apparatus of claim 35 wherein the sintered bronze is impregnated with graphite.

37. The apparatus of claim 24 additionally comprising a pilot shaft extending from the output shaft and a pilot bearing disposed in the end of the driven shaft which receives the pilot shaft for maintaining the alignment of the first and second disk.

38. The apparatus of claim 24 additionally comprising a pilot shaft extending from the driven shaft and a pilot bearing disposed in the end of the output shaft which receives the pilot shaft for maintaining the alignment of the first and second disks.

39. The apparatus of claim 24 wherein the adjustable plate has a scale inscribed on its outwardly facing surface and the housing has an index pointer for cooperating with the scale.

40. The apparatus of claim 24 wherein the housing has a scale inscribed around the periphery of its open end and the adjustable plate has an index pointer for cooperating with the scale.

41. The apparatus of claim 24 wherein the adjusting plate defines a pair of holes lying on opposite sides of the center of the plate along a common diameter.

42. The apparatus of claim 41 additionally comprising means for rotating the adjustable plate.

43. The apparatus of claim 42 wherein the adjustment means comprises a Y-shaped tool having a handle and first and second arms extending therefrom and first and second adjustment pins extending upwardly from the first and second arms respectively, the pins having a diameter less than that of the adjustment holes and spaced apart so that the adjustment pins cooperate with the adjustment holes.

* * * * *